United States Patent Office 3,336,306
Patented Aug. 15, 1967

3,336,306
OXAZOLOISOINDOLONES AND RELATED
COMPOUNDS
Theodore S. Sulkowski, Narberth, Pa., assignor to American Home Products Corporation, New York, N.Y., a corporation of Delaware
No Drawing. Filed Oct. 22, 1965, Ser. No. 502,352
13 Claims. (Cl. 260—244)

This invention relates to new and useful oxygen and nitrogen containing cyclic ketone compounds as well as to the novel method for their preparation. In particular, the present invention is concerned with oxazoloisoindolones, and oxazinoisoindolones.

The novel compounds which are included within the scope of this invention are selected from the group represented by the formula:

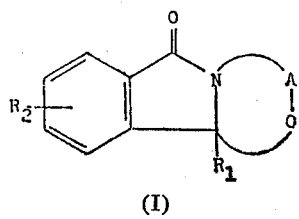

(I)

wherein $R_1$ is selected from the group consisting of thienyl, phenyl, halophenyl, aminophenyl, nitrophenyl, lower alkylphenyl and lower alkoxyphenyl; $R_2$ is selected from the group consisting of hydrogen, halo, nitro, amino, lower alkyl and lower alkoxy; and A is selected from the group consisting of —$CHR_3CHR_3$— and

—$CHR_3CHR_3CHR_3$— wherein $R_3$ is selected from the group consisting of hydrogen, lower alkyl, phenyl, halophenyl, aminophenyl, nitrophenyl, lower alkylphenyl and lower alkoxy.

The new compounds of the above Formula I wherein A is ethylene, properly are called: "oxazoloisoindolones." Typical examples thereof are 2,3 - dihydro - 9b - phenyl-oxazolo[2,3-a]isoindol-5(9bH)-one and 9b - (3 - amino-4-chlorophenyl)-2,3 - dihydrooxazolo[2,3-a]isoindol - 5 (9bH)-one. Those compounds of Formula I wherein A is propylene are called "oxazinoisoindolones," such as 3,4-dihydro-10b-phenyl-2H-1,3-oxazino[2,3 - a] isoindol-6(10bH)-one and 8,9-dichloro-3,4 - dihydro - 4 - methyl-10b-phenyl-2H-1,3 - oxazino[2,3 - a]isoindol - 6(10bH)-one.

In accord with the present invention, the aforementioned oxazoloisoindolones, and oxazinoisoindolones have been found to possess unique pharmaceutical properties which made them useful synthetic therapeutic agents. More particularly, these compounds are central nervous system depressants which exhibit utility as potent anticonvulsants.

In accord with the process of the present invention the above-mentioned oxazoloisoindolones, and oxazinoisoindolones oxazoloisoquinolinones and oxazinoisoquinolinones may be prepared by the reaction of a ketobenzoic acid of the formulae:

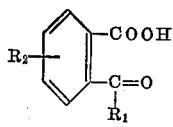

wherein $R_1$ and R are as defined above; with an alkanolamine of the formula:

HO—A—$NH_2$

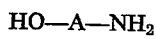

where A has the same meaning as previously set forth.

The reaction is effected by heating a substantially equimolar mixture of the reactants in an inert organic solvent at a temperature from about 30° C. to about 100° C. for a period of from about one to about twenty-four hours. Preferably, this reaction is conducted in toluene at the reflux temperature of the reaction mixture for a period of sixteen to twenty hours. By inert organic solvent as employed herein is meant an organic solvent which dissolves the reactants but does not react with them under the above described reaction conditions. Although other solvents may be employed, as will suggest themselves to those skilled in the art, excellent results have been obtained when the aforesaid toluene is employed as the solvent. The majority of the reactants employed in the process of this invention are known compounds which are readily available from commercial sources, while the remainder can be prepared in accordance with standard organic procedures well known to those skilled in the art.

After the reaction is complete, the reaction mixture is cooled and washed with an aqueous alkaline solution, for example, sodium hydroxide, potassium hydroxide, sodium bicarbonate and sodium carbonate. Thereafter, the product is obtained by conventional methods such as concentration and crystallization. The product may then be recrystallized from suitable alkanol solvents, such as ethanol.

In accord with the above described process, the general reactants listed in Table I react to produce the corresponding listed products, which are representative of the type of compounds within the scope of the present invention. It is intended that the word "substituted" as employed in Table I shall also include the corresponding unsubstituted hydrogen containing moiety.

TABLE I

| Reactants | Products |
|---|---|
| A 2-substituted benzoyl-substituted benzoic acid and a substituted aminoethanol. | A 2,3-substituted-9b-substituted phenyl-2,3-dihydro-substituted oxazolo[2,3-a]isoindol-5(9bH)-one. |
| A 2-substituted benzoyl-substituted benzoic acid and a substituted aminopropanol. | A 2,3,4-substituted-10b-substituted phenyl-3,4-dihydro-2H-1,3-substituted oxazino[2,3-a]isoindol-6(10bH)-one. |

When the compounds of this invention are employed as anticonvulsants, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile suspension containing other solutes, for example, saline or glucose.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 0.1 mg. to about 100.0 mg. per kg. of body weight per day, although as aforementioned variations will occur. However, a dosage level that is in the range of from about 1.0 mg. to about 30.0 mg. per kg. of body weight per day is most desirably employed in order to achieve effective results.

The following examples are given by way of illustration and are not to be construed as limitations of this invention, many variations of which are possible without departing from the scope and spirit thereof.

Example I

Eleven grams of o-benzoic acid, 15 ml. of ethanolamine and 100 ml. of toluene are refluxed for 18 hours in a flask equipped with a water separator. The solution is cooled, washed with water and saturated sodium carbonate solution. After drying over magnesium sulfate, the solution is evaporated to an oil which solidifies on cooling. On recrystallization from aqueous alcohol there is obtained 2,3 - dihydro - 9b - phenyloxazolo[2,3 - a]isoindol-5(9bH)-one, M.P. 147–9° C.

*Analysis.*—Calcd. for $C_{16}H_{13}NO_2$: C, 76.48; H, 5.21; N, 5.57. Found: C, 76.50; H, 5.10; N, 5.71.

Utilizing the above procedure, 9b-(p-chlorophenyl)-2,3-dihydro - 3 - methyl - 2 - phenyloxazolo[2,3 - a]isoindol-5(9bH)-one, M.P. 128°–130° C. is produced.

Example II

Five grams of 2-benzoyl-4-nitrobenzoic acid, 7 grams of 2-aminobutanol-1 and 50 ml. of toluene are refluxed for 20 hours in a flask equipped with a water separator. The solution is then cooled and washed with water and a saturated sodium carbonate solution. After drying over magnesium sulfate, the solution is evaporated to dryness. In this manner, is obtained 2,3-dihydro-3-ethyl-8-nitro-9b-phenyloxazolo[2,3-a]isoindol-5(9bH)-one.

In a similar manner, when 2-benzoyl-4-methoxy-benzoic acid is reacted with 3-aminobutanol-2 there is obtained 2,3-dihydro-8-methoxy-2,3-dimethyl-9b-phenyloxazolo[2,3-a]isoindol-5(9bH)-one and when 2-(p-methoxybenzoyl)benzoic acid is reacted with 2-aminopropanol-1, there is produced 2,3-dihydro-9b-(p-methoxyphenyl)-2-methyloxazolo[2,3-a]isoindol-5(9bH)-one.

Example III

When the procedure described in the foregoing Examples is followed reacting the appropriate benzoyl benzoic acids and alkanolamines, the hereinafter listed products are obtained:

9b-(m-bromophenyl)-3-butyl-2,3-dihydrooxazolo[2,3-a]-isoindol-5(9bH)-one,
8-amino-2-(p-chlorophenyl)-2,3-dihydro-9b-phenyloxazolo[2,3-a]isoindol-5(9bH)-one,
2,3-dihydro-9b-(p-iodophenyl)-2-(p-tolyl)-oxazolo[2,3-a]isoindol-5(9bH)-one,
3-(p-aminophenyl)-2,3-dihydro-9b-phenyloxazolo[2,3-a]isoindol-5(9bH)-one,
2,3-dihydro-4-(o-nitrophenyl)-9b-phenyloxazolo[2,3-a]-isoindol-5(9bH)-one,
6-chloro-2,3-dihydro-3-(p-iodophenyl)-9b-phenyloxazolo[2,3-a]isoindol-5(9bH)-one,
8-bromo-2,3-dihydro-9b-(p-nitrophenyl)-oxazolo[2,3-a]-isoindol-5(9bH)-one,
2,3-dihydro-9b-(m-tolyl)-oxazolo[2,3-a]isoindol-5(9bH)-one,
2,3-dihydro-2-(p-pentoxyphenyl)-9b-phenyloxazolo-[2,3-a]isoindol-5(9bH)-one,
2,3-dihydro-2-(p-ethoxyphenyl)-9b-(p-pentylphenyl)-oxazolo[2,3-a]isoindol-5(9bH)-one,
2,3-dihydro-3-(m-ethylphenyl)-7-iodo-9b-phenyloxazolo-[2,3-a]isoindol-5(9bH)-one,
7,8-diethyl-2,3-dihydro-3-(p-heptyl)-oxazolo[2,3-a]-isoindol-5(9bH)-one.

Example IV

Twenty-seven grams of 3-amino-2-carboxy-4-chlorobenzophenone, 20 ml. of ethanolamine and 200 ml. of toluene are refluxed 16 hours in a flask equipped with a water separator. The solution is cooled, washed with water and with a saturated sodium carbonate solution. After drying over magnesium sulfate, the solution is evaporated to a solid residue. On recrystallization from ethanol, there is obtained 9b-(3-amino-4-chlorophenyl) - 2,3 - dihydrooxazolo[2,3-a]isoindol-5(9bH)-one, M.P. 162–4° C.

*Analysis.*—Calcd. for $C_{16}H_{13}ClN_2O_2$: C, 63.90; H, 4.35; N, 9.32; Cl, 11.79. Found: C, 63.64; H, 4.27; N, 9.53; Cl, 11.6.

In a similar manner, there was produced 9b-(p-chlorophenyl) - 2,3 - dihydro-2-phenyloxazolo[2,3-a]isoindol-5(9bH)-one, M.P. 156–158° C.

Example V

Twenty-two grams of o-benzoylbenzoic acid, 20 ml. of 3-aminopropanol, and 75 ml. of toluene are refluxed 18 hours in a flask equipped with a water separator. The solution is cooled, washed with water and with saturated sodium carbonate solution. After drying over magnesium sulfate, the solution is evaporated to an oil which solidifies on cooling. On recrystallization from aqueous ethanol, there is obtained 3,4-dihydro-10b-phenyl-2H-1,3-oxazino-[2,3-a]isoindol-6(10bH)-one, M.P. 127–9° C.

*Analysis.*—Calcd. for $C_{17}H_{15}NO_2$: C, 76.96; H, 5.70; N, 5.28. Found: C, 76.75; H, 5.80; N, 5.45.

Example VI

When the procedure of Example VI is repeated with the hereinafter listed starting compounds the following benzoxazoninone products are obtained:

| Starting Compounds | Products |
| --- | --- |
| 2-benzoyl-4,5-dichlorobenzoic acid and 3-aminobutanol-1. | 8,9-dichloro-3,4-dihydro-4-methyl-10b-phenyl-2H-1,3-oxazino [2,3-a]isoindol-6(10bH)-one. |
| 2-(2-thenoyl)benzoic acid and 4-aminobutanol-2. | 3,4-dihydro-2-methyl-10b-(2-thienyl)-2H-1,3-oxazino[2,3-a] isoindol-6(10bH)-one. |
| 2-(p-ethylbenzoyl)-4-bromobenzoic acid and 6-aminohexanol-4. | 9-bromo-3,4-dihydro-10b-(p-ethylphenyl)-4-propyl-2H-1,3-oxazino [2,3-a]isoindol-6(10bH)-one. |

Example VII

Twenty-six grams of o-(p-chlorobenzoyl)benzoic acid, 20 ml. of 3-aminopropanol and 75 ml. of toluene are refluxed for 20 hours in a flask equipped with a water separator. The solution is then cooled and washed with water and a saturated sodium carbonate solution. After drying over magnesium sulfate, the solution is evaporated to dryness and the residue is recrystallized from aqueous ethanol. In this manner, there is obtained 10b-(p-chlorophenyl)-3,4-dihydro - 2H - 1,3 - oxazino[2,3-a]isoindol-6(10bH)-one, M.P. 146–8° C.

*Analysis.*—Calcd. for $C_{17}H_{14}ClNO_2$: C, 68.10; H, 4.70; N, 4.67; Cl. 11.83. Found: C, 68.24; H, 4.54; N, 4.71; Cl, 11.7.

Using the procedure described above, the following compounds are prepared:

3,4-dihydro-10b-(p-pentoxyphenyl)-2H-1,3-oxazino [2,3-a]isoindol-6(10bH)-one,
3-(p-bromophenyl)-3,4-dihydro-8-ethoxy-10b-phenyl-2H-1,3-oxazino[2,3-a]isoindol-6(10bH)-one,
3,4-dihydro-9-hexyl-10b-phenyl-2H-1,3-oxazino [2,3-a]isoindol-6(10bH)-one.

Example VIII

Twenty-seven grams of 3-amino-2'-carboxy-4-chlorobenzophenone, 20 ml. of 3-aminopropanol and 75 ml. of toluene are refluxed for 24 hours. Thereafter, the solution is cooled, washed with water and a dilute sodium hydroxide solution. After drying over magnesium sulfate, the solution is evaporated to dryness and the residue is recrystallized from aqueous propanol. In this manner, was obtained 10b-(3-amino-4-chlorophenyl)-3,4-dihydro-2H-1,3-oxazino[2,3-a]isoindol-6(10bH)-one, M.P. 212–4° C.

*Analysis.*—Calcd. for $C_{17}H_{15}ClN_2O_2$: C, 64.86; H, 4.80; N, 8.90; Cl, 11.27. Found: C, 64.65; H, 4.75; N, 8.56; Cl, 11.2.

In a similar manner, 8-butoxy-3,4-dihydro-10b-phenyl-2H-1,3-oxazino[2,3-a]isoindol-6(10bH)-one is produced.

What is claimed is:
1. A compound selected from the group consisting of those having the formula:

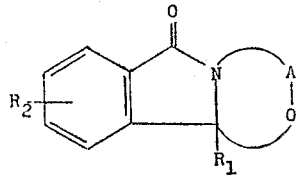

wherein $R_1$ is selected from the group consisting of thienyl, phenyl, halophenyl, aminophenyl, nitrophenyl, lower alkylphenyl and lower alkoxyphenyl; $R_2$ is selected from the group consisting of hydrogen, halo, nitro, amino, lower alkyl and lower alkoxy; and A is selected from the group consisting of —$CHR_3CHR_3$— and —$CHR_3CHR_3CHR_3$—, wherein $R_3$ is selected from the group consisting of hydrogen, lower alkyl, phenyl, halophenyl, aminophenyl, nitrophenyl, lower alkylphenyl and lower alkoxy.

2. 9b - (p - chlorophenyl) - 2,3 - dihydro - 3 - methyl-2-phenyloxazolo[2,3-a]isoindol-5(9bH)-one.

3. 9b - (p - chlorophenyl) - 2,3 - dihydro - 2 - phenyl-oxazolo[2,3-a]isoindol-5(9bH)-one.

4. 2,3 - dihydro - 9b - (p - methoxyphenyl) - 2 - methyl-oxazolo[2,3-a]isoindol-5(9bH)-one.

5. A compound selected from the group consisting of those having the formula:

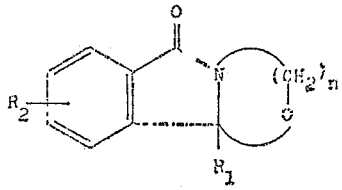

wherein $R_1$ is selected from the group consisting of thienyl, phenyl, halophenyl, aminophenyl, nitrophenyl, lower alkylphenyl and lower alkoxyphenyl; $R_2$ is selected from the group consisting of hydrogen, halo, nitro, amino, lower alkyl and lower alkoxy; and $n$ is an integer of from 2 to 3.

6. 2,3 - dihydro - 9b - phenyloxazolo[2,3 - a]isoindol-5(9bH)-one.

7. 9b - (3 - amino - 4 - chlorophenyl) - 2,3 - dihydro-oxazolo[2,3-a]isoindol-5(9bH)-one.

8. 3,4-dihydro - 10b - phenyl - 2H - 1,3 - oxazino[2,3-a]isoindol-6(10bH)-one.

9. 10b - (p-chlorophenyl) - 3,4 - dihydro - 2H - 1,3-oxazino[2,3-a]isoindol-6(10bH)-one.

10. 10b - (3 - amino - 4 - chlorophenyl) - 3,4 - dihydro-2H-1,3-oxazino[2,3-a]isoindol-6(10bH)-one.

11. A process for the production of a compound selected from the group consisting of the formula:

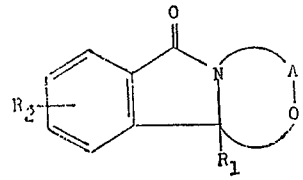

wherein $R_1$ is selected from the group consisting of thienyl, phenyl, halophenyl, aminophenyl, nitrophenyl, lower alkylphenyl and lower alkoxyphenyl; $R_2$ is selected from the group consisting of hydrogen, halo, nitro, amino, lower alkyl and lower alkoxy; and A is selected from the group consisting of —$CHR_3CHR_3$— and

—$CHR_3CHR_3CHR_3$— wherein $R_3$ is selected from the group consisting of hydrogen, lower alkyl, phenyl, halophenyl, aminophenyl, nitrophenyl, lower alkylphenyl and lower alkoxy, which comprises contacting a compound selected from the group consisting of the formula:

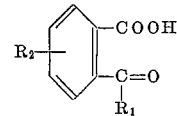

wherein $R_1$ and $R_2$ are defined as above, with a compound of the formula:

$$HO—A—NH_2$$

wherein A is defined as above; in a reaction-inert organic solvent at a temperature that is in the range from about 30° C. to about 100° C. for a period of from about one to about twenty-four hours.

12. A process as claimed in claim 11 wherein the reaction-inert organic solvent is toluene.

13. A process as claimed in claim 12 wherein the reaction is conducted at the reflux temperature of the reaction mixture.

References Cited
UNITED STATES PATENTS
3,255,186   6/1966   Moffett _____ 260—244

WALTER A. MODANCE, *Primary Examiner.*

R. BOND, *Assistant Examiner.*

Notice of Adverse Decision in Interference

In Interference No. 96,802 involving Patent No. 3,336,306, T. S. Sulkowski, OXAZOLOISOINDOLONES AND RELATED COMPOUNDS, final judgment adverse to the patentee was rendered Oct. 28, 1969, as to claims 1, 5, 6, 7, 8, 11 and 12.

[*Official Gazette January 13, 1970.*]

UNITED STATES PATENT OFFICE
CERTIFICATE OF CORRECTION

Patent No. 3,336,306                      August 15, 1967

Theodore S. Sulkowski

It is certified that error appears in the above identified patent and that said Letters Patent are hereby corrected as shown below:

Column 1, lines 59 and 60, cancel "oxazoloisoquinolinones and oxazinoisoquinolinones".

Signed and sealed this 17th day of March 1970.

(SEAL)
Attest:

Edward M. Fletcher, Jr.                      WILLIAM E. SCHUYLER, JR.
Attesting Officer                            Commissioner of Patents